US012766818B2

(12) United States Patent
Molinas

(10) Patent No.: US 12,766,818 B2
(45) Date of Patent: Oct. 20, 2026

(54) CORK-BASED TEXTILE ARTICLE AND PROCESS FOR THE MANUFACTURING THEREOF

(71) Applicant: LEBIU SRL, Calangianus (IT)

(72) Inventor: Fabio Molinas, Calangianus (IT)

(73) Assignee: LEBIU SRL, Calangianus (IT)

( * ) Notice: Subject to any disclaimer, the term of this patent is extended or adjusted under 35 U.S.C. 154(b) by 248 days.

(21) Appl. No.: 18/281,462

(22) PCT Filed: Mar. 9, 2022

(86) PCT No.: PCT/EP2022/056077
§ 371 (c)(1),
(2) Date: Sep. 11, 2023

(87) PCT Pub. No.: WO2022/189527
PCT Pub. Date: Sep. 15, 2022

(65) Prior Publication Data

US 2024/0149574 A1 May 9, 2024

(30) Foreign Application Priority Data

Mar. 12, 2021 (IT) ........................ 102021000005906

(51) Int. Cl.
*B32B 27/12* (2006.01)
*B32B 5/02* (2006.01)
(Continued)

(52) U.S. Cl.
CPC ................ *B32B 27/12* (2013.01); *B32B 5/02* (2013.01); *B32B 7/12* (2013.01); *B32B 27/20* (2013.01);
(Continued)

(58) Field of Classification Search
CPC .. B32B 27/12; B32B 5/02; B32B 7/12; B32B 27/20; B32B 27/26; B32B 2250/02;
(Continued)

(56) References Cited

U.S. PATENT DOCUMENTS 1,608,243 A 11/1926 Schavoir
2,858,210 A * 10/1958 Archer .................. D21H 17/02 162/151
3,821,135 A 6/1974 King
5,256,478 A * 10/1993 Tanabe .................... B60R 13/08 428/326
(Continued)

FOREIGN PATENT DOCUMENTS

CN 108004675 A1 5/2018
EP 3051023 A1 8/2016
(Continued)

*Primary Examiner* — Elizabeth M Imani
(74) *Attorney, Agent, or Firm* — Volpe Koenig

(57) ABSTRACT

Cork-based textile article and process for the manufacturing thereof. In a cork-based textile article, comprising: a first substrate (F,1) comprising a natural/synthetic fabric or non-woven fabric obtained from a mixture of fibres and cork particles; and a second substrate (B,10) comprising an elastomeric polymer mixed with an amount of cork particles not lower than 5% by weight, and a curing agent, the first and the second substrates (1,10) being coupled therebetween at high pressure, so as to obtain a curing of the elastomeric polymer, whereby an effect wholly similar to leather, or suede or a biodenim, with a high cork content, is obtained.

6 Claims, 4 Drawing Sheets

(51) Int. Cl.

| | |
|---|---|
| ***B32B 7/12*** | (2006.01) |
| ***B32B 27/20*** | (2006.01) |
| ***B32B 27/26*** | (2006.01) |

(52) U.S. Cl.

CPC .......... *B32B 27/26* (2013.01); *B32B 2250/02* (2013.01); *B32B 2255/02* (2013.01); *B32B 2262/062* (2013.01); *B32B 2317/02* (2013.01)

(58) Field of Classification Search

CPC .......... B32B 2255/02; B32B 2262/062; B32B 2317/02; B32B 7/02; B32B 9/02; B32B 2262/065; B32B 2264/067; B32B 2264/1021; B32B 2264/1023; B32B 2264/30; B32B 2307/7163; B32B 2307/72; B32B 5/022; B32B 5/024; B32B 27/40

See application file for complete search history.

(56) References Cited

U.S. PATENT DOCUMENTS

| | | | | |
|---|---|---|---|---|
| 2011/0250807 | A1* | 10/2011 | Kalbe | B32B 5/30<br>442/304 |
| 2011/0263174 | A1* | 10/2011 | Ketzer | B32B 27/04<br>428/304.4 |
| 2021/0212491 | A1 | 7/2021 | Augustin | |
| 2023/0373189 | A1* | 11/2023 | Nielsen | B32B 7/12 |

FOREIGN PATENT DOCUMENTS

| | | | |
|---|---|---|---|
| EP | 3308953 | A1 | 4/2018 |
| GB | 834938 | A | 5/1960 |
| WO | 9941050 | A1 | 8/1999 |
| WO | 2011149370 | A1 | 12/2011 |
| WO | 2019157540 | A1 | 8/2019 |

* cited by examiner

CORK-BASED TEXTILE ARTICLE AND PROCESS FOR THE MANUFACTURING THEREOF

The present invention relates to a cork-based textile article, as well to a process focused on the manufacturing thereof.

In particular, the above-mentioned cork-based textile article is devised to have aesthetic and tactile features similar to those of leather, or of suede, or still of the textile article known with the appellation bio-denim, from the name of the well-known cotton cloth named "denim", i.e. a textile effect obtained on a textile layer by means of an additive deposition of the cork particles, from the mixture of different components, and it can be used both as coating and for packaging cloths.

One of the first attempts at using cork for obtaining a laminate assimilable to a cloth dates back to U.S. Pat. No. 1,608,243 A, describing a coupling between a base made of fabric and a mixture formed by finely chopped cork and other components such as resins and gums, to obtain a flexible substrate with the cork surface features.

Even International patent application No. WO 99/41050 A1 describes a coupling between a substrate made of fabric and a sheet of cork which has been chemically treated to obtain a substantial softening of the sheet itself, so that the physical and tactile features thereof could be similar to the ones of the a fabric or a leather.

Korean patent application No. 2016/119,541 A describes another example of multi-layered fabric which is implemented by means of a coupling with a cork laminate, and a substrate made of a non-woven fabric, by means of several lamination steps which provide the use of at least a film made of a thermoplastic material or the like.

European patent application No. 3,308,953 A1 describes a cork-based multi-layered film, comprising a sequence of superimposed layers of laminated cork, each one coupled with a respective layer of fibres, and a layer of covering made of resin. Even in this case there is no cork powder.

Another example of this type is described in Korean patent application No. 2017/022,929 A.

Here, and in other similar cases, the presence of laminated cork provides the final textile article a level of stiffness which is undesired in a leather-like article.

European patent application No. 3,051,023 A1 describes a multi-layered material comprising: a layer made of cork particles and a polyurethane; a substrate of fibres and a covering layer. However, the cork particles, which can even be identified as powder or cork granulate) are present in only one of the layers implemented by the lamination process, and this makes that the features of the final product are not so similar to those of cork.

International patent application No. WO 2011/149370 A1 describes a multi-layered fabric made of cork comprising a supporting layer made of fibres such as cotton or wool, a layer made of agglomerates of cork impregnated in a matrix of polyurethane, and an additional polymeric layer. Even in this case, by supposing that under agglomerate a cork powder agglomerate could be meant, this component is not present in the other layers, but in only one of them, by making the final result not sufficiently similar to the cork.

British patent No. 834,938A describes a multi-layer material, the purpose thereof is to replace leather or suede, comprising: a base layer, a polyester layer, cork powder, dye and cellulose, a coating layer made of paint or other natural or synthetic materials. Even in this case, as it is explicitly mentioned that only one layer comprises cork powder, the textile article resulting therefrom has not the cork surface features.

Finally, U.S. Pat. No. 3,821,135 A discloses a shaped article made from a molding composition suitable for forming shaperd articles, such as shoe insole and the like, comprising a free flowing particulate granular mixture of cork, water and polyurethane resin solutions and adhesively bonded to another layered material with no cork.

Chinese patent application No. 108 004 675 A is related to a sound-absorbing non-woven fabric composite material, not aimed to a favourable tactile feeling, having cork particles and other fibrous material incorporated into a soft polyurethane foam.

U.S. Pat. No. 2,858,210 A discloses a felt containing cork particles for footwear insoles and the like, laminated with another felt layer with no cork.

Generally, since one wants to obtain a textile article having physical features similar to those of leather, but which also provides the feeling of being a cork-based product, the use of cork laminates produces a not sufficiently flexible substrate, whereas when cork-based powder mixed with a filling agent is used, it requires that the final article comprises even additional substrates without cork to be able to be used instead of a fabric or a leather, then moving away from the original cork appearance.

The technical problem underlying the present invention is to provide a textile article, as well as a process for the manufacturing thereof, allowing to obviate the drawback mentioned with reference to the known art.

Such problem is solved by a textile article as specified above, as defined in the enclosed claim 1, which, by way of example, preferably comprises a first substrate, comprising a woven fabric and/or a non-woven fabric, obtained from a mixture of fibres, and cork particles, and a second substrate, comprising an elastomeric polymer mixed with an amount of cork particles not lower than 5% by weight, and a curing agent, or an elastomeric polymer as base for flocking cork particles and microfibres.

Then, this textile article preferably comprises an elastomeric film, which is superficially honed to have said second substrate emerging partially through the film, so as to uncover the cork particles contained in the above mentioned substrates.

Then, the first and second substrates, with said possible elastomeric film coupled thereto and honed, undergo a couplig process at high pressure, so as to cure the elastomeric polymer.

The main advantage of the textile article and of the relative manufacturing process according to the present invention lies in allowing the use of cork powder with very fine sizes, for example a particulate with sizes from 40 to 400 micrometres, which can be derived from the production waste of the corks for bottle closures, to create environment-friendly fabrics by using components and additives possibly having biological base and aromas extracted through water vapour, without solvents deriving from oil or from non-renewable sources, having physical, aesthetical and tactile features similar to those of leather.

The present invention will be herein described according to a preferred and not limiting embodiment thereof with reference to the enclosed drawings wherein.

Figure 1:
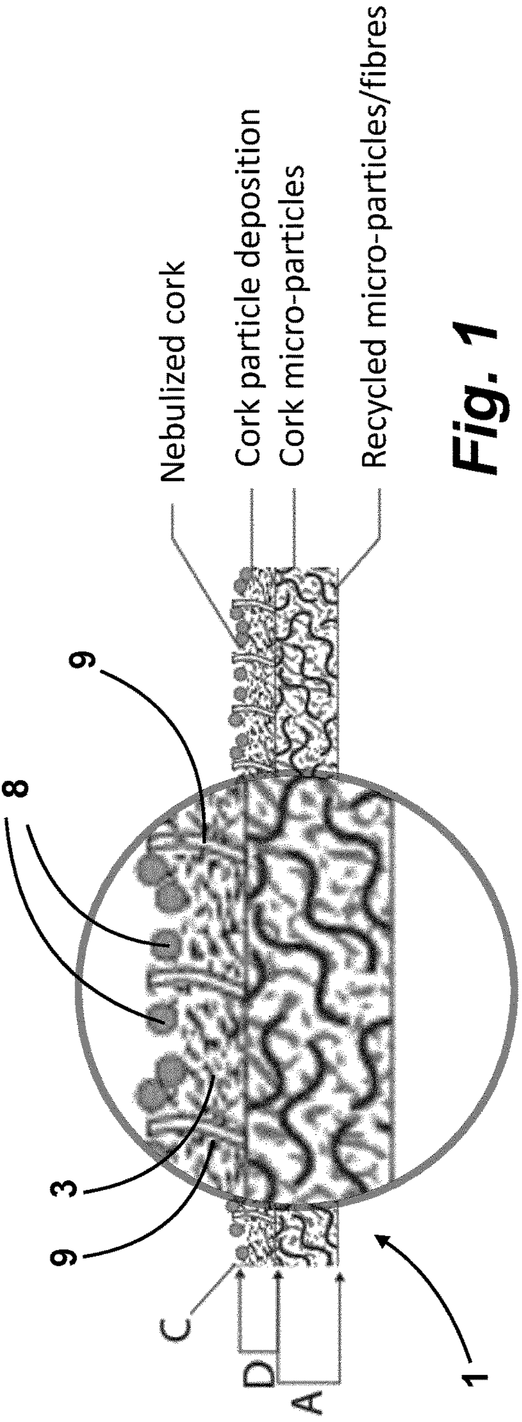
FIG. 1 shows a cross section of a first laminar substrate of the textile article according to the present invention, with a magnification area.

With reference to the figures, FIG. 1 represents a semi-finished product of a first substrate, herein designated with 1, which is determined by the coupling of a fibrous layer A with additional surface layers which will be detailed hereinafter.

The semi-finished product 1 then substantially consists of a fibrous layer A made of natural/synthetic fabric or non-woven fabric which, in the present example, consists of a mixture of recycled fibres, which can be natural fibres of vegetable origin or recycled cellulosic fibres, mixed with a filling agent which could include polylactic acid (PLA) and/or a polyurethane (PU), preferably a recyclable polyurethane.

The above-mentioned fibrous mixture includes micro-particles made of cork, for example recovered from the cork closures processing, having sizes preferably comprised between 40 and 400 μm.

The content by weight of the cork particles in said mixture has to be at least 4%, preferably comprised between 7% and 15%.

The fibres used to implement the fabric, which in general could be natural and/or synthetic fabric, or a non-woven fabric, can be natural microfibres 2 such as, for example, vegetable fibres made of cotton, hemp, linen, in case derived from a recycling procedure of cotton or PET.

In case of non-woven fabric, the microfibres 2, once mixed with the filling agent and with the cork particles and, to obtain the non-woven tissue can be extruded to form the non-woven tissue with the desired thickness. This mixture is then polymerized in first polymerization step, at a temperature comprised between 150° C. and 180° C.

In case one wishes to use a natural or synthetic fabric, it will be sufficient to prepare the substrate for its manufacturing.

The thickness of this first fibrous layer A, once the polymerization has ended, varies from 0.5 mm to 2.0 mm.

On the fibrous layer A, a first surface layer D is implemented, for example by means of a flocking process, which will be described hereinafter, or a process for the resin treatment of the fibrous layer A, preferably by using recycled micro-fibres 9, for example fibres of polyamide and/or cotton, mixed with cork particles 3 adhering to the support and to the microfibres and to an adhesive agent, preferably of organic origin.

The content by weight of the cork particles 3 in the flocking or resin-treatment step has to be at least 4%, preferably comprised between 7% and 15%.

By means of a flocking step, it is possible to orient the micro-fibres upwards, by orienting them vertically through the use of a controlled electrostatic tension, and by obtaining the adhesion of the cork particles 3 and of the micro-fibres 9 thanks to the adhesive agent (FIG. 1).

Figure 2:
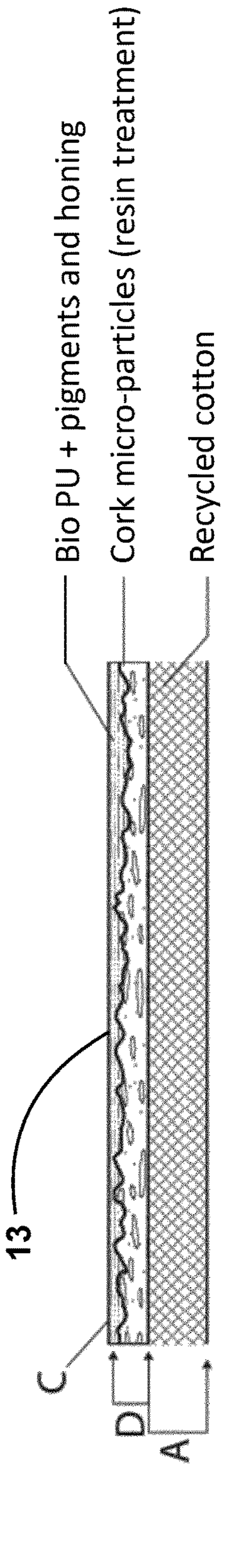
FIG. 2 shows a cross section of a variant of the of the first laminar substrate.

By means of the resin treatment, it is possible to cure the compound with the particles so as to create an irregular spongy film which dampens the impacts and provides a natural texture to the substrate (FIG. 2).

The first surface layer D will have a minimum thickness of 0.12 mm.

With reference to FIG. 2, by way of example, the first surface layer D is deposited by resin treatment on a different type of substrate, that is another fibrous layer, in this case made of textile fibres such as woven cotton, preferably recycled cotton.

Moreover, the application of a second surface layer C is provided (FIGS. 1 and 2), which can be added to the previously described flocked or resin-treated first surface layer D, deposited by means of a technique for nebulizing cork particles 8, and by applying then another surface film in an elastomeric material, such as a bio polyurethane, comprising pigments and in case other cork particles mixed therein.

Subsequently, the elastomeric surface film is industrially honed, by using for example sandpapers or other honing elements, in order to make the first surface layer to partially emerge, thus uncovering and making visible the nebulized cork particles 8, mixed in the polymer, or those already present in the first surface layer D.

The second surface layer C is obtained by means of a step of nebulizing an aqueous nebulizable emulsified mixture still comprising an amount of cork micro-particles 8, for example having the above-specified same, or higher, size, water and a polyurethane.

The content by weight of the cork particles in said emulsified mixture has to be at least 7%, preferably comprised between 5% and 10%.

This nebulization is performed by means of a micronization of the aqueous mixture allowing a reduction of the water drops, of the cork and of the polyurethane in particles having a size in the order of 20-250 μm with a gaseous consistence, thus allowing a controlled widespread of the aqueous mixture on the fibrous layer A.

This process step improves the results obtained by traditional systems and it does not produce waste to be discarded.

Moreover, it is possible to obtain several different effects: honing, water repellent, antimicrobial with the addition of additives and resins having an easy maintenance, dyes, oxidant agents.

With the micro-nebulization system, it is possible to include cork particles 8 by mechanically customizing the device and chemically implementing a more stable and emulsifiable composition with particles.

To the emulsified mixture even pigments of natural origin and additives, which can include cork aroma, can be added.

The cork aroma is extracted in two ways: by applying to cork particles vapour or an ethanol solution; both methods can be used indifferently.

In a second moment, the aroma can be incapsulated in bubbles resisting to high temperatures, to avoid that the aroma evaporates in a subsequent polymerization step, but so that it persists in the substrate.

These bubbles can consist of particles made of zeolite 11 wherein the cork aroma is absorbed.

Figure 4:
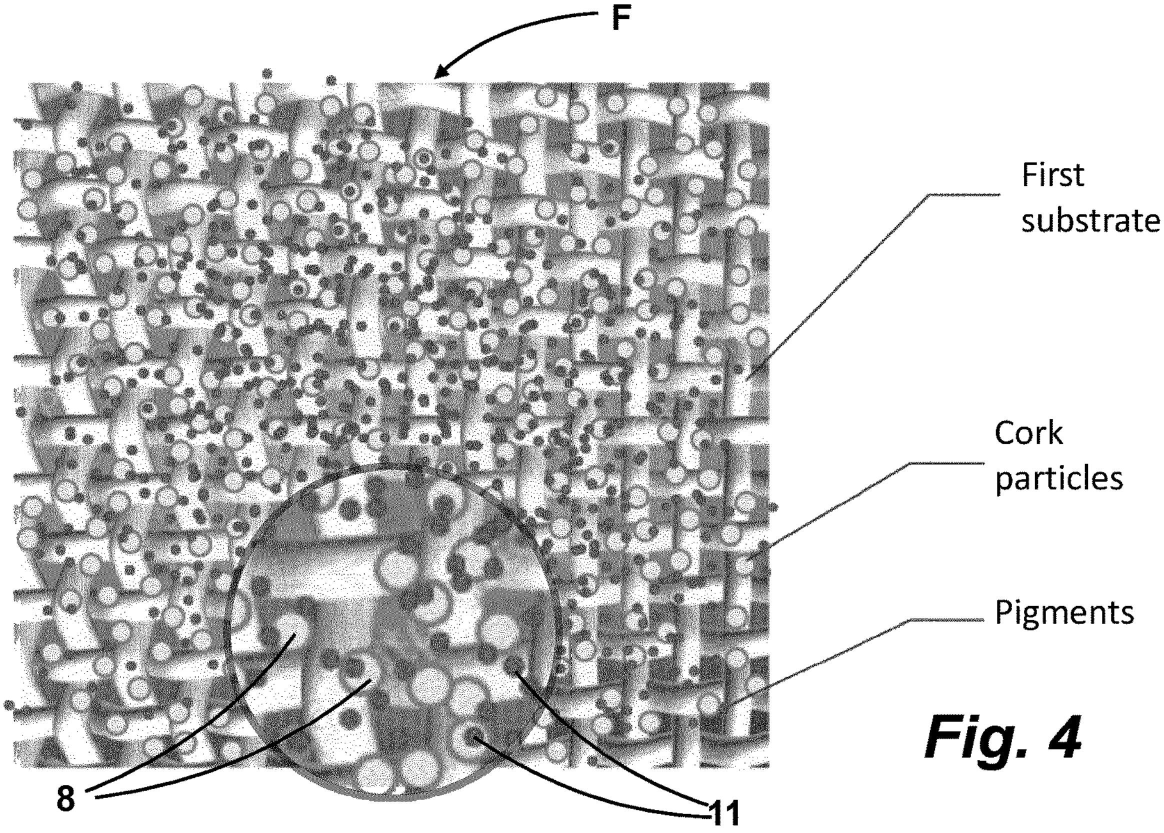
FIG. 4 shows a top view and a respective enlargement of the first one of said substrates, in an intermediate processing step.

The coupling of the fibrous layer A with the surface layers C and D then produces a first substrate F (FIG. 4), which undergoes a second polymerization step, at a temperature comprised between 150° C. and 180° C., preferably 160° C., with the application of a lamination pressure thanks thereto the cork particles penetrate inside the fibres, by producing a more natural effect to the so-obtained composite material.

Figure 3:
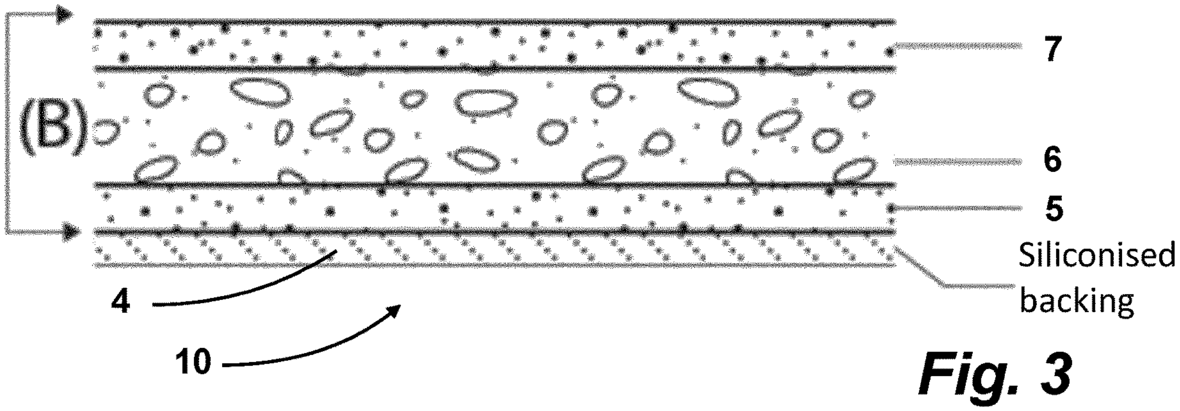
FIG. 3 shows a cross section of a second laminar substrate of the textile article according to the present invention.

With reference to FIG. 3, a second substrate B is described which is obtained by incorporating, on a sheet 4 of a siliconized backing, for example siliconised paper to be used as a release liner, at least a base layer comprising an elastomeric polymer enriched with cork particles, and a curing agent.

In the present embodiment, the subsequent deposition of three supporting layers is provided, that is a first supporting layer 5 in contact with the sheet 4, a second intermediate supporting layer 6, deposited on the first supporting layer 5, and a third external supporting layer 7 consisting too of cork particles and adhesive agents which will be joined to the first substrate illustrated with reference to the preceding figures.

Generally, the composition of the supporting layers can include:

a) micro-particles of recycled cork, preferably sieved and purified to prevent the formation of lumps, in an amount by weight variable between 3% and 25% and with sizes comprised between 40 μm and 400 μm;

b) a recyclable polyurethane, in an amount by weight variable between 40% and 80%;

c) microspheres made of Zeolite, soaked in cork aroma extract, in an amount by weight variable between 1% and 3%;

d) a pigment, preferably a pigment of vegetable origin, in an amount by weight variable between 5% and 8%; and e) a curing agent, in an amount by weight variable between 0.5% and 2%.

The exact amounts of each one of the above-mentioned ingredients are varied from layer to layer, even based upon the type of textile article which one wishes to obtain.

The layers are obtained by mixing the above-mentioned ingredients, and by depositing the base mixture obtained by means of a deposition technique on the sheet 4, layer after layer, so as to obtain a stratification on the sheet 4 of the wished number of layers, each one with their composition. These variations modify the features of the final textile article.

A preferred technique for the deposition of the layers is a doctor blade deposition, or doctor blade printing.

For example, the first supporting agent 5, which is the first one to be deposited and will result to be the visible layer once the siliconized release liner 4 is removed, consists of a film with thickness equal to 0.12 mm of mixture of the above-mentioned ingredients, however formulated with different percentages of auxiliary and additive agents.

In the second intermediate supporting layer 6 the density of the cork powder is increased so that the layer is more compact, with a thickness variable from 0.25 mm to 0.50 mm. The third layer 7 is made to be cured to provide the suitable spongy effect of the leather. The curing can be reached in two ways: by means of microspheres which cure with high temperature, or with a high-pressure curing. The thickness can vary from 0.50 mm to 1.00 mm.

The third layer comprises cork powder and an elastomeric polymer, such as for example a bio-based polyurethane, with adhesive features, to couple the substrates created between them.

Figure 6:
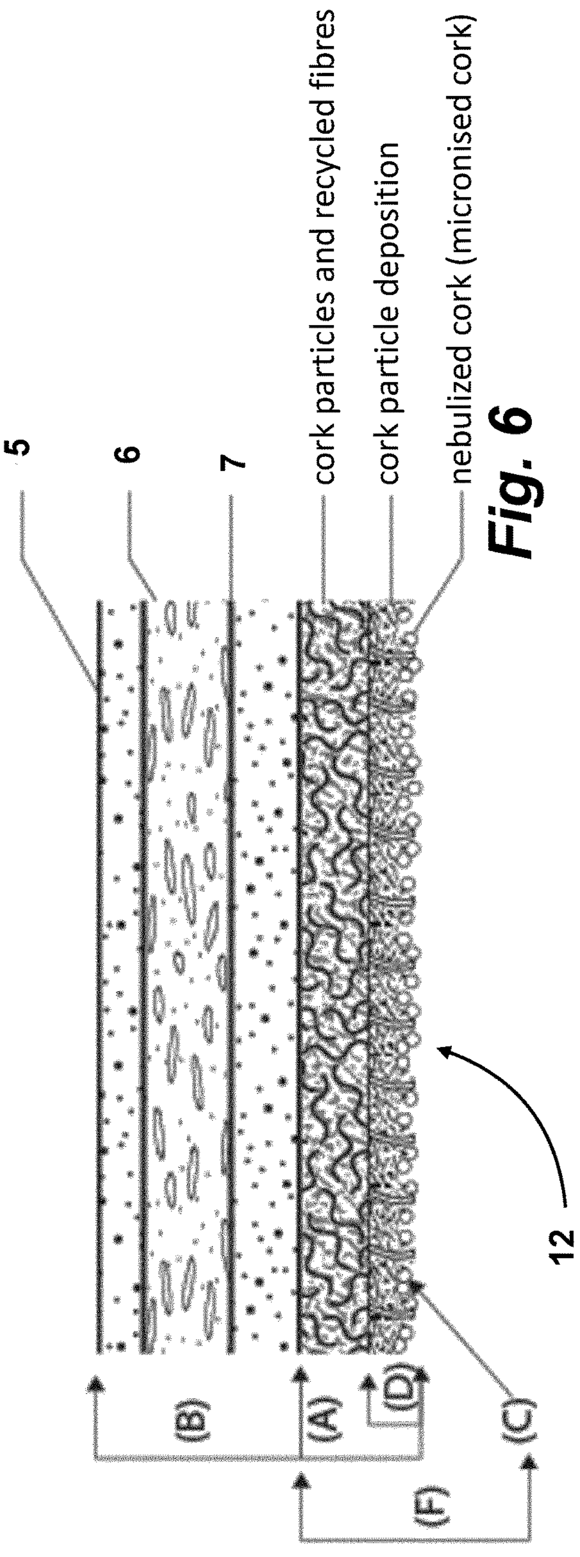
FIG. 6 shows a cross section of the final implementation of the textile article according to the present invention.

The final textile article 12 (FIG. 6) is obtained by coupling the first substrate F and the second substrate B, after removal of the silicone supporting sheet 4.

Such coupling takes place by determining the curing of the second substrate B, by applying suitable pressure and temperature.

The coupling then can be performed by using the lamination technique, and it will allow to obtain the desired effects.

Figure 5:
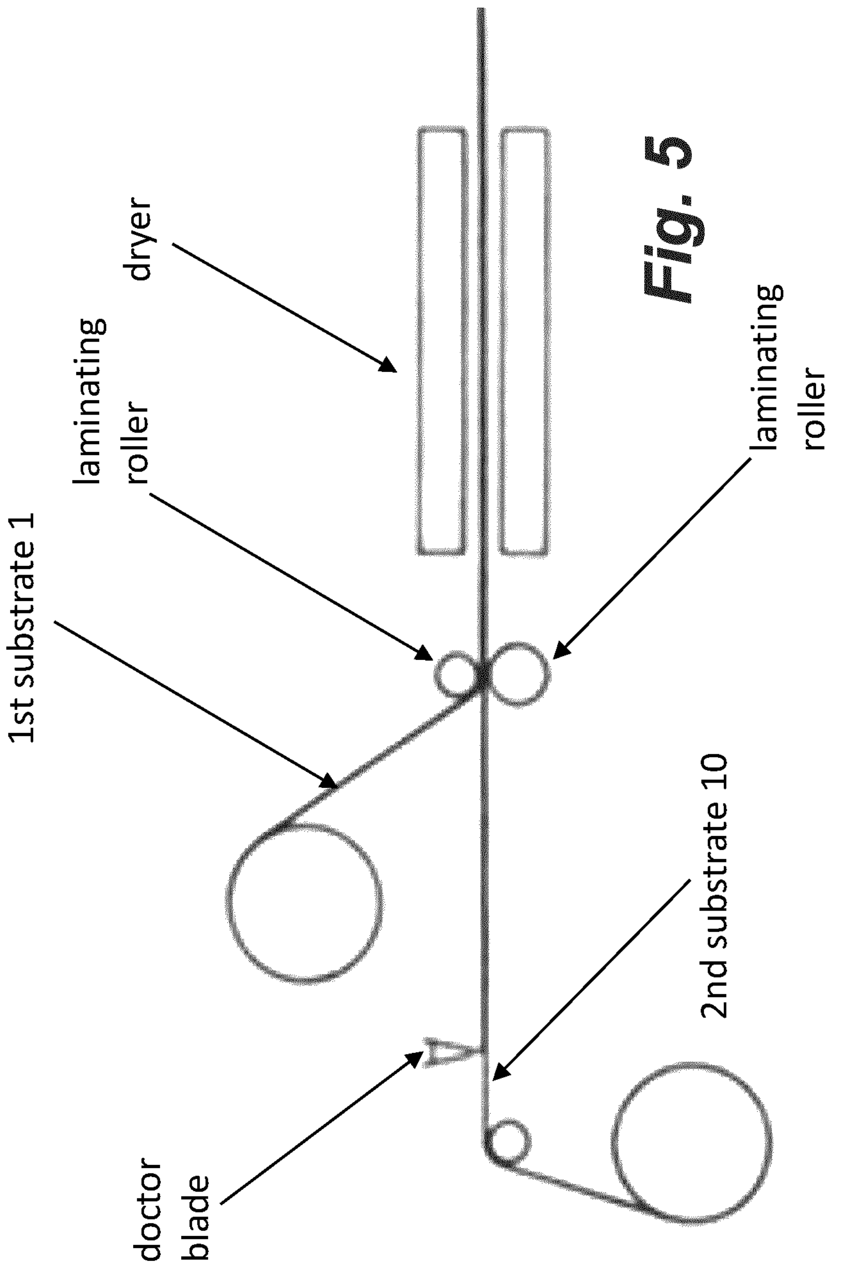
FIG. 5 shows a scheme illustrating the process for forming said substrates and their coupling by lamination.

The above-mentioned coupling can be performed together with the doctor blade deposition, with a roll to roll technique (FIG. 5). The lamination rolls implement the above-mentioned polymerization at a temperature not lower than 160° C. The adhesion of the two substrates is generated thanks to the adhesive layer 3 of the substrate B, on the face of the first substrate which has to be adhered to the second substrate.

In this way a fabric very similar to the animal skin is created, with a coated face determined by the first substrate, and a face wherein the surface is protected by the second substrate with a spongy effect. The non-woven fabric could be used without the need of sewing an internal lining to hide a possible textile support, as it happens in other synthetic leathers on the market.

Figure 7:
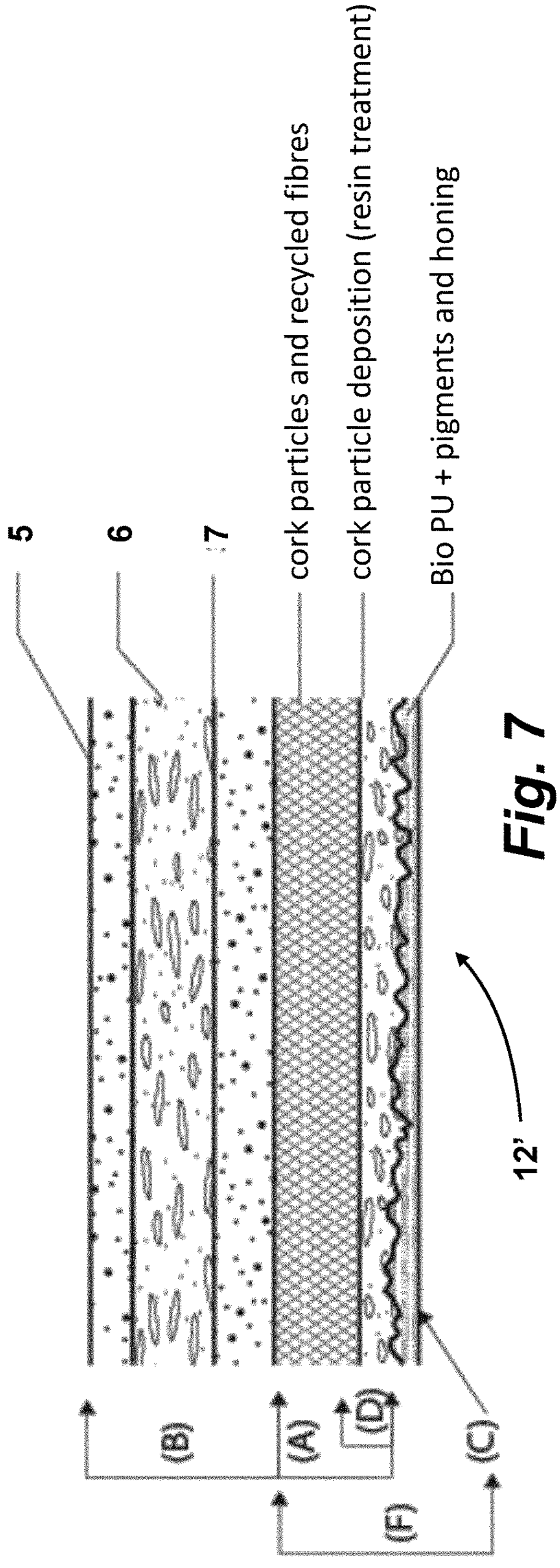
FIG. 7 shows a cross section of another final implementation version of the textile article according to the present invention.

With reference instead to FIG. 7, another embodiment version 12' of the textile article according to the invention is illustrated, wherein the first substrate is the one described with reference to FIG. 2, wherein the supporting layer is of the textile type, for example made of cotton, with a resin treatment of fibres and cork particles and a honed elastomeric film, so as to make visible the cork particles of the underlying surface layer.

Thanks to the above-described process, by varying the amounts of cork, the order of the techniques and the percentage amount of other ingredients, it is possible to obtain different textures, such as for example a textile article with leather, suede, denim effect, in case with the use of an additional textile support, for example made of cotton, hemp, linen and the like.

With the above-described technique, then, it is possible to obtain a textile article made of a material consisting in recycled cork powder, bio-polymers, recycled fibres and cork aroma, which provides a new application of cork in a more environmental-friendly way thanks to the used base additives and the percentage of cork residue which can exceed 70% of the total composition.

Moreover, the textile article may be double-face, by differentiating from other similar products on the market, by favouring the use on both sides to give a real leather appearance to the so-obtained composite material.

By varying the composition and the sequence of the layers, it is possible to obtain from cork a series of at least three different finishing types: synthetic leather, suede and denim.

Moreover, by using the micro-nebulization step, the cork particles are visible in surface, providing a more realistic appearance to the textile article, which is also recyclable.

Thanks to the used techniques, it is possible to obtain a substantial reduction in the $CO_2$ emissions derived from the incineration of the cork residue, and a water and energy saving around 60% with respect to other materials existing on the market.

To the above-described textile article a person skilled in the art, with the purpose of satisfying additional and contingent needs, could introduce several additional modifications and variants, however all comprised within the protective scope of the present invention, as defined by the enclosed claims.

The invention claimed is:

1. A cork-based textile article, comprising:

a first substrate (F) comprising a woven fabric and/or a non-woven fabric, obtained from a mixture of fibers, and cork particles; and a second substrate (B) comprising an elastomeric polymer mixed with an amount of cork particles not lower than 5% by weight, and a curing agent, the first and the second substrate being coupled therebetween at a pressure sufficient so as to obtain a curing of the elastomeric polymer, wherein the second substrate includes one or more overlapped layers, each one comprising an elastomeric polymer mixed with an amount of cork particles not lower than 5% by weight and different from layer to layer, and a curing agent and wherein said one or more overlapped layers comprise:

a) cork micro-particles, in an amount by weight from 5% and 25% and with sizes comprised between 40 um and 400 um;

b) a recyclable polyurethane, in an amount by weight variable between 40% and 80%;

c) microspheres made of Zeolite, soaked in cork extract, in an amount by weight variable between 1% and 3%;

d) a pigment in an amount by weight variable between 5% and 8%; and e) a curing agent, in an amount by weight variable between 0.5% and 2%.

2. The textile article according to claim 1, wherein said non-woven fabric comprises a filling agent selected from the group consisting of: polylactic acid (PLA), polyurethane (PU) and mixtures thereof.

3. The textile article according to claim 1, wherein in said natural/synthetic or non-woven fabric the content by weight of the cork particles in said mixture is at least 3%.

4. The textile article according to claim 1, wherein said non-woven fabric comprises natural fibers such as vegetable fibers selected from the group consisting of: cotton, hemp, linen, and mixtures thereof.

5. The textile article according to claim 1, wherein said non-woven fabric has a thickness from 0.5 mm to 2.0 mm.

6. The textile article according to claim 1, wherein said non-woven fabric comprises a surface layer comprising fibers and cork particles adhering to said second substrate by an adhesive agent, wherein the content by weight of the cork particles is at least 4%.

* * * * *